Nov. 12, 1968 W. F. BEAUSOLEIL ET AL 3,411,143

INSTRUCTION ADDRESS CONTROL BY PERIPHERAL DEVICES

Filed Jan. 13, 1966 5 Sheets-Sheet 1

INVENTORS
WILLIAM F. BEAUSOLEIL
ANDRIS PADEGS

BY [signature]

ATTORNEY

Nov. 12, 1968 W. F. BEAUSOLEIL ET AL 3,411,143

INSTRUCTION ADDRESS CONTROL BY PERIPHERAL DEVICES

Filed Jan. 13, 1966 5 Sheets-Sheet 3

United States Patent Office 3,411,143
Patented Nov. 12, 1968

3,411,143
INSTRUCTION ADDRESS CONTROL BY PERIPHERAL DEVICES

William F. Beausoleil, Le Cap Antibes, France, and Andris Padegs, Poughkeepsie, N.Y., assignors to International Business Machines Corporation, Armonk, N.Y., a corporation of New York Filed Jan. 13, 1966, Ser. No. 520,414
6 Claims. (Cl. 340—172.5)

ABSTRACT OF THE DISCLOSURE

A data processing system having a memory and an input/output (I/O) channel for controlling an I/O device. A squence of command control words are stored in sequential addresses in memory. An initial instruction to the channel gives the channel the address where the first command control word is stored in memory. The location address of this first command control word is retained in the channel. At the completion of the I/O operation called for by this first command, the location address of the first command retained in the channel is incremented by one address to thereby specify the next sequential address and hence, the next command. Upon the occurrence of a signal from the I/O device, the channel increments the address by more than one so that the next sequential command is passed over. This provides a way of modifying the sequence of commands without interrupting the computer to obtain a new initializing command.

FIELD OF THE INVENTION

This invention relates to apparatus for sequencing a series of instructions controlling the operation of a peripheral device of a data processing system and more particularly to such apparatus to provide a branch on condition to a new control instruction for operation of such peripheral devices.

*Description of the prior art*

Input/output devices such as magnetic tape units, card readers, card punches, printers and the like, as well as other peripheral equipment such as large auxiliary core storage units operate with data transfer rates that are much slower than the data transfer rate between the central processor and the main core storage of a data processing system. There are many prior art methods for adapting the slower peripheral devices for operation with the faster data processing system. Early prior art data processing systems overcame this asynchronism by suspending all arithmetic and logic operations of the central processor during the time when an input/output device had access to the main storage. Because of the slow transfer rates of the I/O device, the operation of the central processor in such a system was suspended for the major portion of the computing time.

In order to release the central processor (CPU) to resume its operation during input/output (I/O) data transfer, more recent data processing systems have employed separate I/O control apparatus to execute the various I/O commands independently of the central processing unit which is only required to execute a start I/O instruction. Such control apparatus are normally referred to as data synchronizers or as channels. With such a data synchronizer or channel, the execution of a channel command word thereby may control the transfer of large blocks of data between any specified one of a number of I/O devices and a specified memory area without interruption of the CPU. Since only one memory accessing operation at a time is normally possible, priority circuits determine which peripheral device receives access or whether the CPU or an external peripheral device receives access.

Such a channel apparatus is adapted not only to execute particular channel command words but also to select a new channel command word upon completion of the execution of the previous channel command word and to do so without interrupting the CPU. Thus, the programmer can, by the insertion of one instruction in main program, designate the execution of a plurality of channel command words to control a sequence of more than one particular I/O operation while the CPU is released to continue its own program. Such a system may not only control I/O operation, but may also be employed to communicate with another processor of a multi-processing system or to control operation of a special purpose slave processor where the attached processors are treated by the main program as I/O devices. Furthermore, such a system can be employed to control the operation of other peripheral devices of a data processing system.

Although the operations described above allow the CPU to more efficiently execute its program in parallel with I/O operation, it will be appreciated that conditions may occur at the peripheral device which require a change of sequence of execution of I/O commands. One manner in which this type of problem has been handled in prior art computers has been to scatter "conditional branch" instructions throughout the program. However, it will be appreciated that a channel apparatus is not a general purpose computer. Its purpose is to relieve the central processor from control of I/O operations with a minimum of circuitry. A channel of optimum design should not be required to handle unduly long programs such as would be involved when a plurality of branch instructions are employed. Furthermore, provision of hardware for "microprogramming" would also unduly increase the cost and amount of circuitry required.

In prior art data processing systems the sequence of instructions in the channels was fixed. These instructions could be listed in a sequence in which each instruction is executed only once, or by using branch instructions, loops could be formed. This sequence, however, could not be changed rapidly in response to conditions occurring in I/O devices.

In certain applications it is desirable to modify the sequence of execution of channel command words in response to conditions signalled by the device. For example, it may be desirable to conduct a search for particular information stored in a peripheral device such as a drum storage or a disc storage where the channel command is an instruction to read and compare an address or an identifying code recorded at the I/O device with a key code provided by the program. If the two codes do not compare, the next channel command word instructs a transfer in the command sequence back to the original command word to cause a comparison of the next address or identification code with the key code. This program loop will be followed until a comparison is achieved between an identification code and key code at which time there will be a branch on condition to a new channel command word which will instruct the peripheral device to transfer the data associated with the last identification code into or from main store. Such an operation cannot be performed by prior art channels without interrupting the CPU.

*Summary of the invention*

It is an object of the present invention to provide a new and improved apparatus to control peripheral operation.

It is another object of the present invention to provide an improved control apparatus for peripheral devices to execute a program loop operation.

It is still another object of the present invention to provide an improved control apparatus for peripheral devices that are capable of causing a branch on condition operation.

It is still another object of the present invention to provide an improved control apparatus for peripheral devices adapted to search for particular information stored therein.

In the King, et al. patent application, Serial Number 357,369, filed April 6, 1964 and assigned to the assignee of the present application, there is disclosed an automatic channel apparatus which disclosure is incorporated herein by reference. The present invention resides in features adapted to channel apparatus of the type described therein. With this type of channel apparatus, an I/O operation is initiated when the CPU executes an instruction specifying the type of operation, the channel address and the I/O unit. Thereupon the channel is directed to enter main storage at a designated location and obtain a channel address word (CAW) which in turn provides the location in main storage of the desired channel command word (CCW). The channel command word includes an operation code field, a data address to be accessed in main storage, and a count field to indicate the number of data units to be transferred. One of the bits of a flag field in the channel command word indicates whether or not chaining is to be initiated at the end of the particular operation. This causes the channel command word to be chained to a new channel command word in the next adjacent location of main storage. Furthermore, one of the operations specified by the operation code in the channel command word can be that of a transfer-in-channel command to another channel command word which resides at some other storage location. Thus, a series of channel commands can be executed including a branch to another set of commands.

With the present invention, a signal from the peripheral device transmitted over an I/O interface is employed to select a new channel command word displaced in storage from the current command word by a predetermined number of storage locations thereby providing for branching on a condition determined by the peripheral device. Furthermore, the I/O interface may be between the channel and an adapter to which another CPU is coupled and in this case, the present invention may be employed for synchronizing of two different data processing systems for branching purposes.

A feature then of the present invention resides in a channel or I/O operation control unit for a data processing system which unit may be activated by an instruction initiated by the CPU and which unit includes means to select and execute a series of I/O commands and a means responsive to an external condition to select a new I/O command word.

These and other objects, advantages and features of the present invention will become more readily apparent from the following specification when taken in conjunction with the drawings.

*General description of the data processing system*

Figure 1:
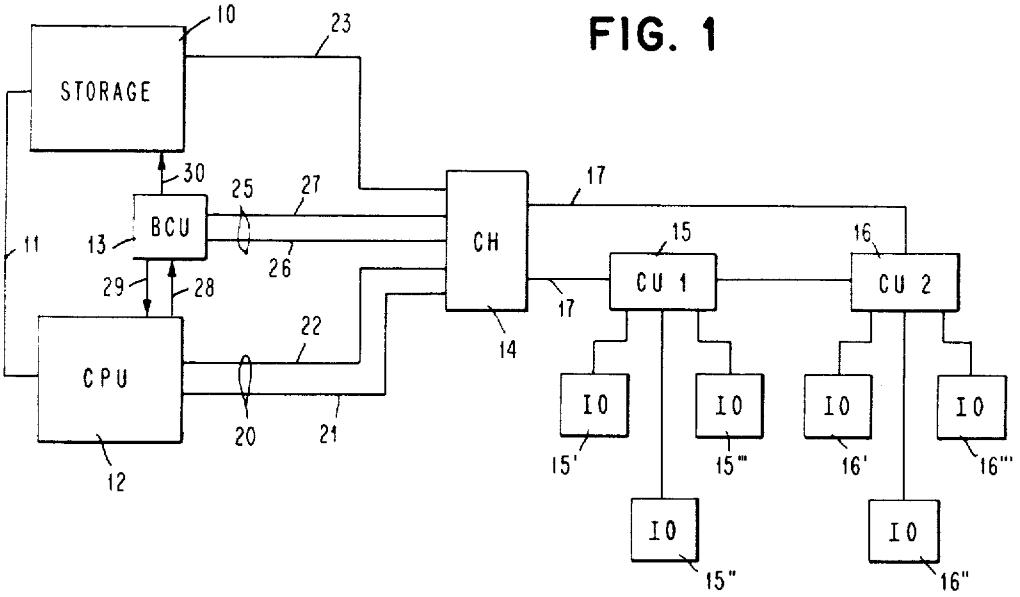
FIGURE 1 is a schematic diagram of a data processing system employing the present invention.

Referring to FIGURE 1, an information processing system of the form contemplated by the present invention includes a main core storage unit 10 connected through a suitable bus 11 to a central processing unit CPU 12. A plurality of control units 15 and 16 individually govern a plurality of connected input/output devices 15′ . . . 15‴ and 16′ . . . 16‴. The control units are connected through an I/O interface bus 17 of 28 lines to be described hereinafter. The bus 17 also includes a priority selection bus (not shown) since all control units time share the bus 17.

Each I/O interface bus connects to a data channel 14. Each data channel 14 is connected to the CPU through a CPU interface 20 including a multiplex bus 22 and a plurality of simplex or single direction lines 21. All data channel units share the multiplex bus 22.

Each channel unit is connected to the storage unit 10 by way of a storage interface 23 which is operated as a multiplexed bus by a bus control unit 13, described, for example in IBM Customer Engineering Instruction—Reference—7090 Data Processing System, published 1961 by International Business Machines Corporation, pages 28 through 44. A bus control interface 25 comprising a multiplex bus 27 and individual simplex lines 26 interconnects the channel units and bus control unit 25. Completing the bus control unit is storage bus 30 and a CPU bus in 29 and bus out 28.

Before describing the general detailed construction and operation of the channel, it is believed in order to describe the format of binary code combinations which serve as instructions, commands and control orders to initiate the operation of the channel in directing the flow of information between I/O devices and main storage. An instruction is prepared by the CPU and, after decoding, executed by the channel. The instruction may be a start I/O, halt I/O, test I/O, or a test channel. Commands are fetched from memory by the channel when a start I/O instruction is received. Commands, after decoding, initiate I/O operation. The channel is capable of executing write, read, read backwards, control, sense and transfer-in-channel commands. A control command indicates an operation at an I/O device that does not involve transmission of data, e.g., backspacing or rewinding magnetic tape.

Figure 2:
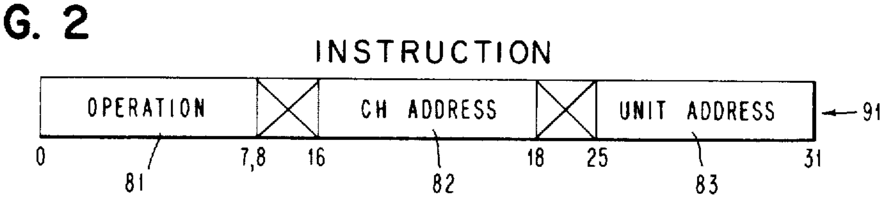
FIGURE 2 is a diagram of a typical instruction to be executed by the central processing unit.

Referring to FIGURE 2, an instruction format 91 is indicated as comprising 32 binary bit positions. The instruction format comprises an operation code field 81, a channel address field 82 and a device or unit address field 83. The operational code is eight binary bits and may describe a START I/O, TEST I/O, HALT I/O and TEST CHANNEL operation. Eight through fifteen and eighteen through twenty-five of the instructions are ignored. The channel address field comprises three binary bits and the device address comprises eight binary bits.

Figure 3:
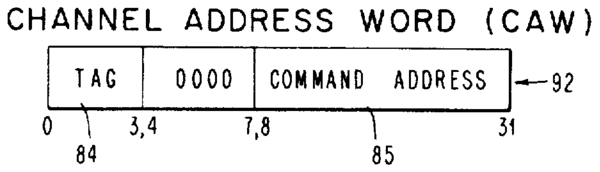
FIGURE 3 is a format of a channel address word.

A START I/O operation selects a channel and a device attached to the channel. The channel automatically enters storage at a designated fixed location to obtain a channel address word (CAW), the format of which is shown in FIGURE 3.

Essentially, the CAW 92 is an indirect address providing the location of the desired command. The CAW, as indicated in FIGURE 3, has 32 binary bit positions including a tag field 84 and a command address field 85. The tag field 84 has four bits which control the access to the memory area in which the I/O operation, i.e., read, write, read backward, etc., will be performed. The command address field 85 specifies the location of a command control word (CCW) which describes the particular I/O operation to be performed. The bit positions 4 through 7 must be binary zeros for CAW validity purposes.

Figure 4:
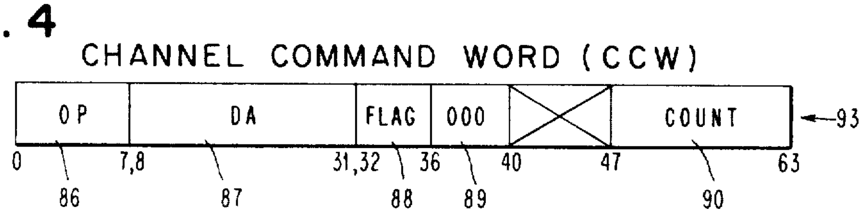
FIGURE 4 is a format of a channel command word.

Referring to FIGURE 4, a channel command word (CCW) 93 format of 64 bit positions plus 8 parity bits (not shown) includes an operation code field 86 of eight bits; a data address field 87 of 24 bits; a flag field 88 of five bits; a buffer field 89 of three bits, and a count field 90 of 16 bits. The bit positions 40 through 47 are ignored. The command field 86 specifies the operation, i.e., read, write, etc., to be performed. The data address field 87 specifies an eight byte storage location in the main storage where the data is to be stored or read. The count 90 specifies the number of data bytes to be processed. Bit positions 37–39 indicate the validity of the CCW. The flag field 88 comprises a chain-data-address flag bit, a chain-command flag bit, a suppress-incorrect-length-indication flag bit, a skip flag bit, and a program-control-interruption flag bit, all of which will be described hereinafter.

Specifically, the commands which may be specified by operation code field 86 of the CCW include write, read, read backward, control, sense, and transfer-in-channel. The operation of these commands will now be discussed.

A write command, appearing in the operation field 86, initiates the execution of a write operation at the I/O device. This command causes data to be transferred from main storage to the I/O device. Data in the storage are fetched in ascending order of addresses starting with the data address specified in the CCW. A CCW used in the write operation is inspected for various flags which indicate error and other conditions encountered in the operation. The write operation may be modified through the appearance of selected bits in the operation field.

A read command initiates the execution of a read operation at the I/O device. This command causes data to be transferred from the I/O device to the main storage. Data are placed in the main storage in ascending order of addresses starting with the address specified in the CCW. All flag bits are inspected during a read operation. The read operation may also be modified by the appearance of selected bits in the operation field.

A read backward command initiates the execution of a read backward operation at the I/O device. This command is applicable to only certain magnetic tape devices, and causes a read operation to be performed with the tape moving backward. The bytes of data within a record are sent to the channel in a sequence that is reverse with respect to that on writing. The data are placed in storage in descending order of addresses starting with the address specified in the CCW. All flags in the CCW are inspected during a read backward operation. Modifier bits may be placed in the operation field to alter the operation.

A control command is used to initiate an operation at the I/O device. The command is fetched from storage and decoded by the I/O device. Back spacing, rewinding magnetic tape or positioning a disk access mechanism are performed by the I/O device. The command specifies the entire control function. The data address designates such additional information as is required for the operation.

The sense command initiates the execution of a sense operation at the I/O device. This command causes sense status information to be transferred from the I/O device to main storage. The information is placed in the storage in ascending order of addresses statring with the address specified in the CCW. The sense status provides more detailed information than that provided in the Channel Status Word CSW described in the above identified King et al. application. The sense command thus provides detailed information concerning the status of the I/O device. Flags are inspected and modifier bits may be included.

The transfer in channel command causes the channel to fetch the next CCW from the location specified in the data address field of the transfer in channel command. Thereafter, the data address is then incremented and placed in a command address register. The command initiates no operation at channel or at the I/O device. The purpose of the transfer-in-channel command is to provide chaining between non-adjacent CCW's. The transfer in channel can occur both in data address and command chaining.

The two low order or least significant bits of the eight bit command code 86 or if these bits are binary zeros, then the four low order bits, identify the command or the operation to the channel. The channel distinguishes between four operations; output forward (write and control); input forward (read and sense); input backward (read backward) and branching (transfer in channel). The remaining four bits of the eight bit command code specify the details of the operation to the I/O device. The command codes for the various operations are as follows:

TABLE I

| | |
|---|---|
| * * * * 0 0 0 0 | Invalid code. |
| MMMM 0 1 0 0 | Sense. |
| XXXX 1 0 0 0 | Transfer in channel. |
| MMMM 1 1 0 0 | Read back wind. |
| MMMM MM 0 1 | Write. |
| MMMM MM 1 0 | Read. |
| MMMM MM 1 1 | Control. |

The M in the code indicates modifier bits.

Particular flags referred to above and included in flag field 88 include chain command (CC), suppress incorrect link indication (SILI), chain data address (CDA), skit, and program control interruption (PCI). The function of these particular flags will now be discussed.

Chain command (CC) flag which appears in bit position 33 gives the programmer the option of initiating multiple I/O operations with a single CPU START I/O instruction. When the count of a particular CCW is exhausted and the CC flag is on, the channel will fetch the next sequential command address.

The suppress incorrect length indication flag (SILI), which appears in bit position 34, controls whether or not an incorrect length condition is indicated to the program. An incorrect length condition exists where the count field of the CCW and the record length do not correspond. When this flag bit is present and the CDA flag is off, the incorrect length indication is suppressed. If the CCW has the CC flag on, command chaining will take place. Absence of the SILI flag or the presence of both the SILI and the CDA flags terminates the operation and causes the program to be interrupted.

The chaining data address flags which appear in bit position 32 specify the action that is to be taken by the channel upon the exhaustion of a CCW or the appearance of various error conditions. When the CCW is exhausted either from a count standpoint or from a command standpoint, a new CCW is acquired without the CPU being required to continue the operation at the next address or beginning a new command. The chain data address (CDA) flag permits different parts of the same record to be stored or fetched from non-contiguous areas in the memory. The channel simply interprets the CDA flag as a signal for it to fetch a new count and chain data address flag. The operation code field in the newly fetched CCW is ignored.

The skip flag which appears in bit position 35 permits the suppression of main storage references during and I/O operation. The skip flag is applicable to read, read backward and sense operation. In all other instances the skip flag is ignored. Skipping affects only the handling of information by the channel. The operation at the I/O device proceeds normally and information is transmitted to the channel. The channel, however, keeps updated the count but does not place the information in the main storage. The skipping feature, when combined with CDA chaining, permits the program to place in main storage selective portions of a record in an I/O device.

The program control interruption flag which appears in bit position 36 permits the programmer to cause an I/O interruption during execution of an I/O operation. Whenever the PCI flag and CCW are on, the channel will attempt to interrupt the proram as soon after start of the transmission as possible. The setting of the PCI flag is inspected in every CCW except those specifying a transfer-in-channel. Modifier bits may be included in the operation field.

The instructions, commands and control orders as presented in the word format, shown in FIGURES 3 and 4, enable the channel to direct the flow of information between I/O devices and main storage. The instructions are decoded and executed by the CPU and are part of the CPU program. Commands are generated by the channel in response to the instruction. Each command is fetched from storage. The control orders are part of the commands and are also fetched from storage. When an instruction, command or order is initiated, the channel performs certain tests before initiation of an operation. In response to an instruction, the channel will send a condition code for the various instructions indicating the status of the channel as operational; not accepted or completed; the channel is actively engaged or that the channel control unit or device is not available to receive the issued instructions. When a channel has accepted an instruction, the address in the instruction is transmitted to the I/O device. The I/O device returns its address to the channel. A proper compare of the sent and received addresses without errors will permit the operation to proceed. In the event an I/O device is unavailable, a signal is transmitted by the I/O device to the channel. The channel returns a condition code to the CPU indicating that the instruction cannot be performed. The CPU thereupon interrogates the storage to determine the condition preventing the I/O device from executing the command.

The present invention is directed toward the utilization of the conditional branch operation together with the above described chain command function and transfer in channel operation.

The command chaining flag gives the programmer the option of initiating multiple I/O operations with a single CPU start I/O instruction. When the count of a particular CCW is exhausted and the CC flag is on, the channel will fetch the next sequential command. This new command will specify either a transfer in channel or a new I/O operation to be performed.

Normally, command chaining takes place and the new operation is initiated only if no unusual conditions are detected in the present operation. If a condition such as data check, incorrect length, or exceptional condition has occurred, the sequence of CCW's is terminated and a condition for I/O interruption is generated. The new CCW is not fetched and the CC flag is ignored. The incorrect length condition does not suppress command chaining if the CCW had both the CC and the SILI flags on. An exception to sequential chaining of CCW's occurs when the I/O device presents the status modifier with the device end signal, which will be discussed hereinafter. The combination of status modifier and device end and the presence of CC flag causes the channel to fetch and chain to the CCW whose main storage address is 16 bytes or words higher than the present CCW. This means that properly handled, the status modifier condition can cause the channel to jump over one complete CCW when chaining.

Command chaining makes it possible for the programmer to initiate the transmission of multiple blocks of data with a single start I/O instruction. It also permits a single instruction to specify certain auxiliary functions such as rewinding tape at the end of a data transmission. Command chaining, in conjunction with the status modifier condition permits the channel to modify the normal sequence of operations in response to signals provided by the I/O device. Since command chaining always involves the initiation of a new I/O operation, there are no restrictions on its use.

Figure 6:
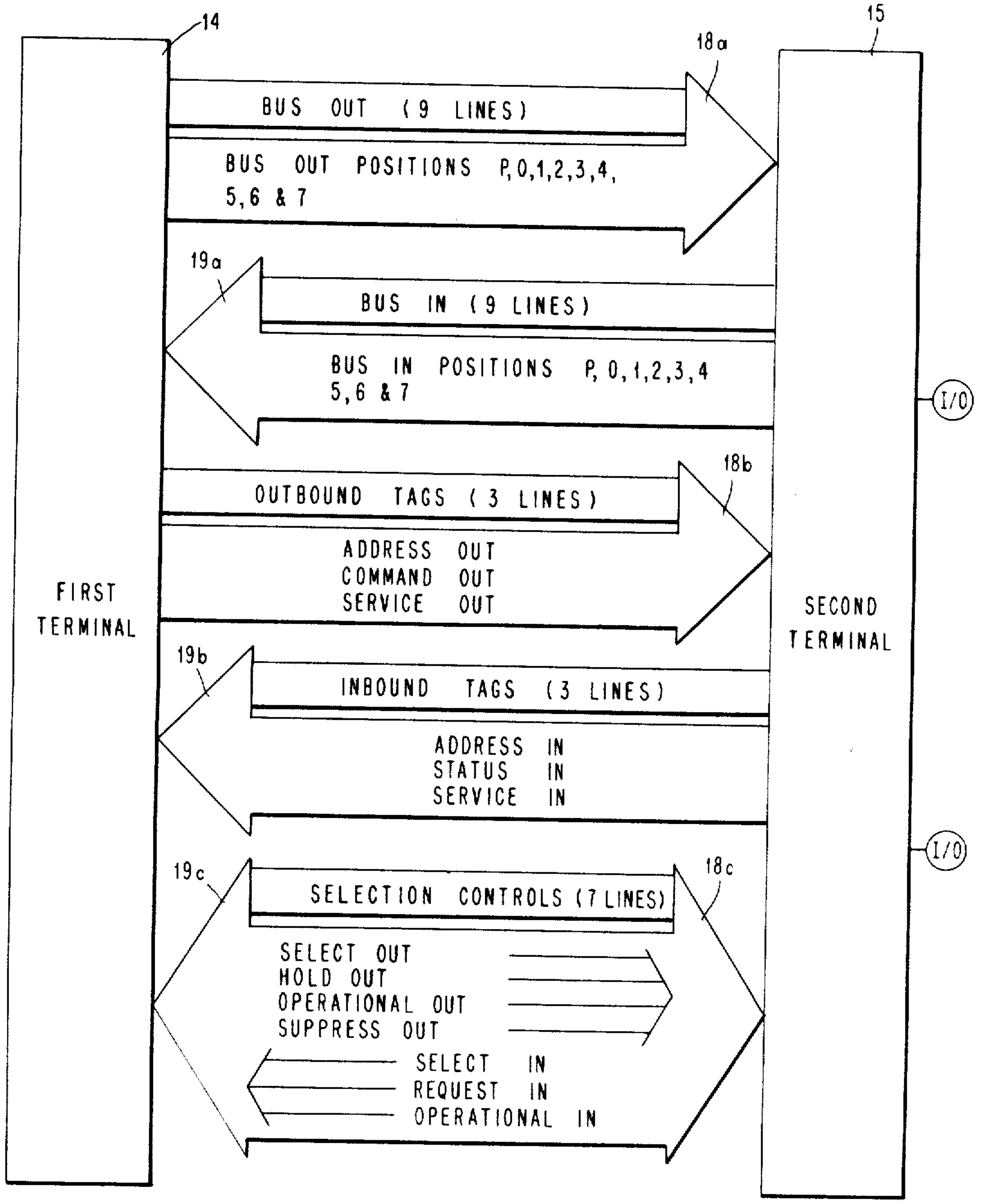
FIGURE 6 is a diagram illustrating the I/O interface.

The particular condition signals from the peripheral device which will cause the conditional branch and the I/O interface upon which the signals appear will now be discussed with reference to FIGURE 6 which is a more detailed diagram of interface 17 shown in FIGURE 1. FIGURE 6 illustrates the various connections between channel 14 and switching unit or control unit 15 that in turn is employed to select a particular I/O or peripheral device or which may be the peripheral device itself. This I/O interface includes bus out 18*a* and bus in 19*a* each of which is comprised of 8 data lines and 1 parity line for transfer from or to channel 14 of either data or control information such as device addresses. The interface also includes outbound tags 18*b* and inbound tags 19*b*, each of which has three lines which are primarily employed to carry signals indicating the type of information on the bus out or bus in. In addition, the interface includes 7 control lines that are employed primarily in establishing an interlock between the channel and a selected one of the terminals or devices to be connected to the channel.

With such an interlocking interface, the peripheral device or second terminal will respond from time to time to the channel by providing status information on the I/O bus in 19*a* while raising the status in inbound tag line. The various conditions to be represented by the status information may include a program interrupt condition represented by an attention bit, a device busy condition, a device end condition and the like. In addition, a particular bit or signal is provided to modify the channel interpretation of any one of the other status information bits. Thus, a device end bit may indicate to the channel that the peripheral device has completed its operation while the presence of a device end signal on the I/O interface and the status modifier bit is employed in the present application to indicate a condition requiring branching. The response of the channel to this combination of status information bits will be more thoroughly described hereinafter. A particular peripheral device adapted to provide such information signals and to respond to the automatic control of the present invention is described in U.S. Patent 3,368,207 filed May 12, 1965 by W. F. Beausoleil et al. and assigned to the same assignee as the present application.

*Detailed description of the channel*

Figure 7A:
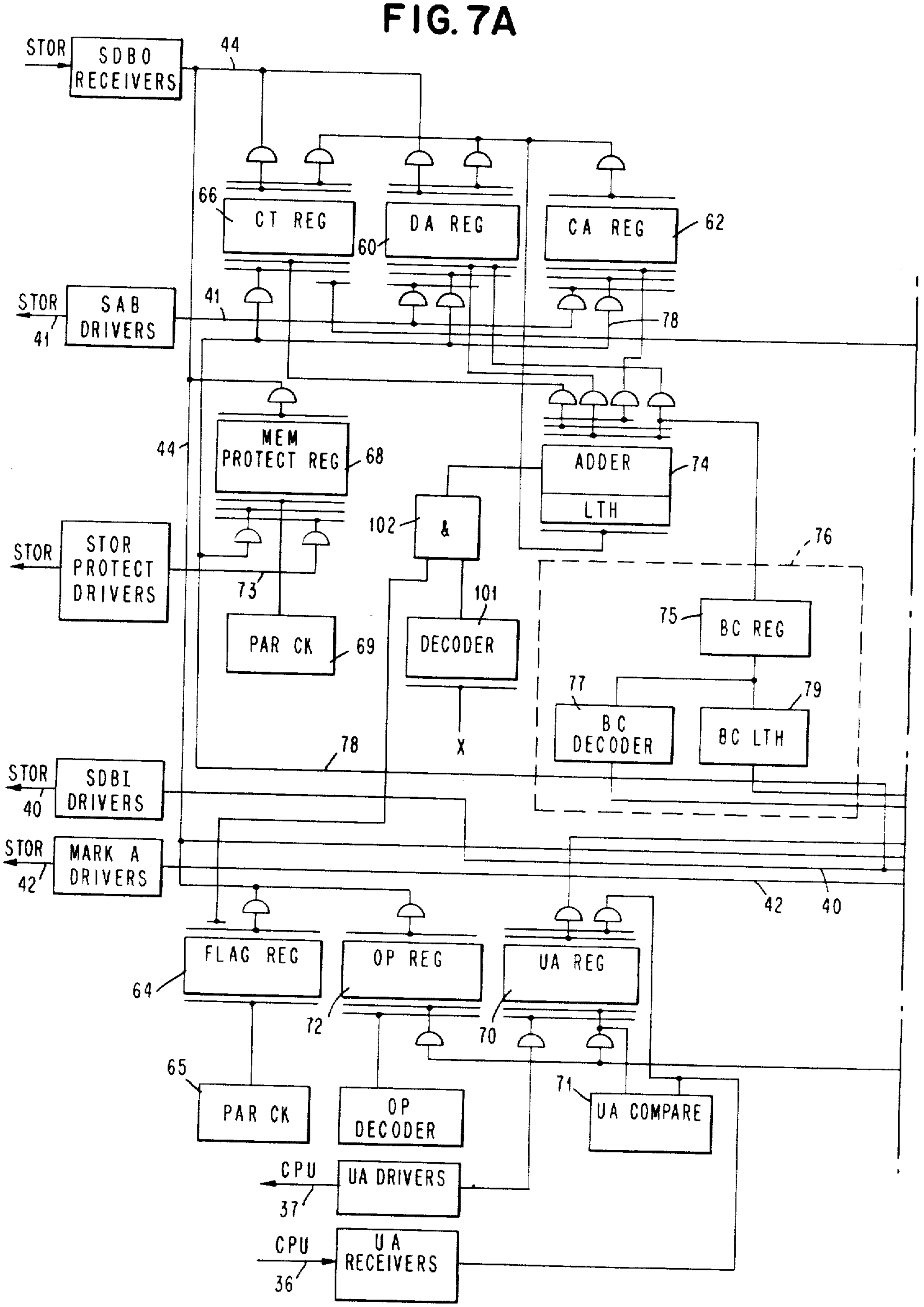
FIGURES 7*a* and 7*b* are a schematic diagram of the circuitry including the present invention.
Figure 7B:
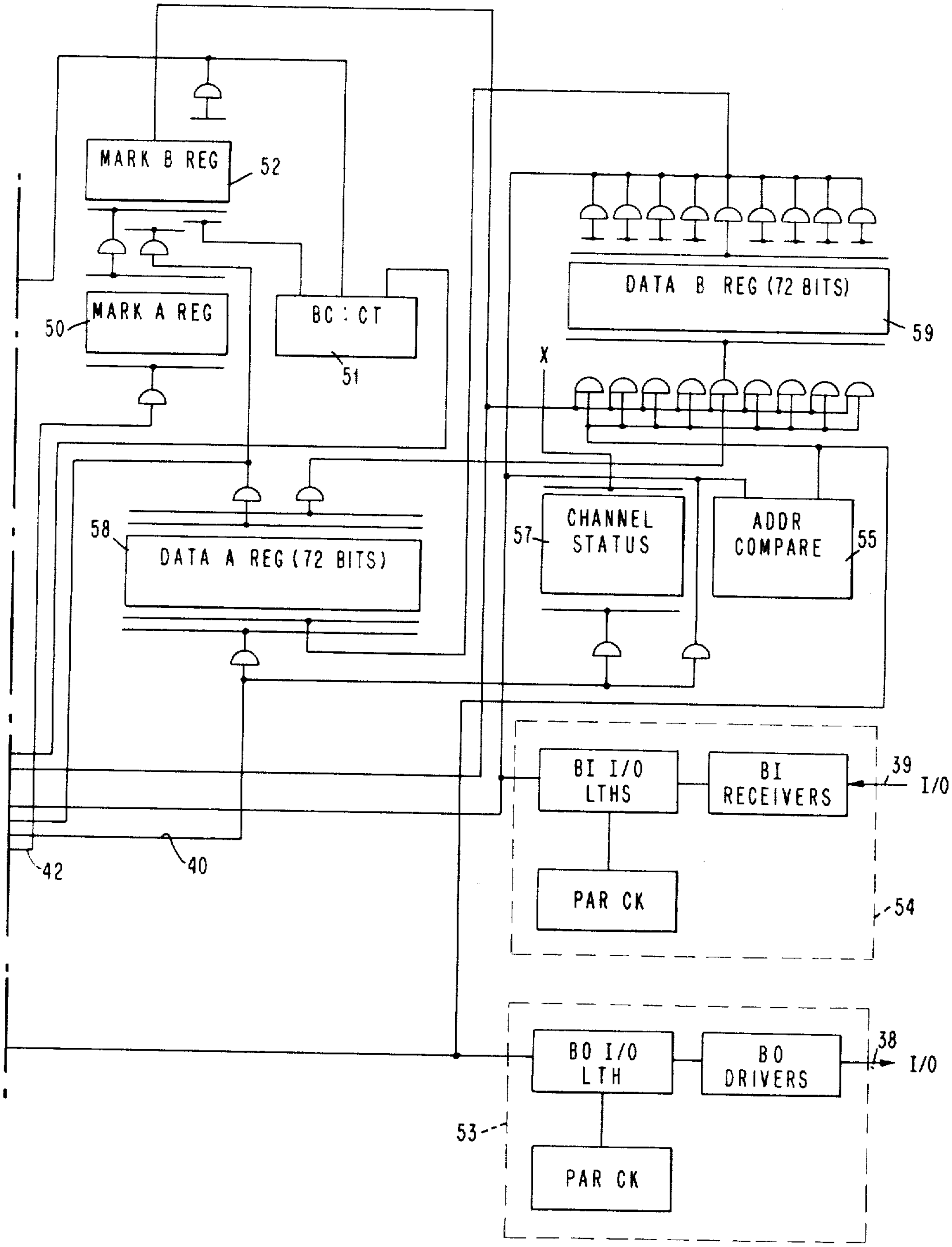

The channel, as shown in FIGURES 7*a* and 7*b*, comprises programming registers, data transfer registers, controls and clock means. These units respond to an instruction from the CPU to transfer information to or from storage. When an I/O device provides any signal that should be brought to the attention of the CPU program, the channel converts the signal to a format compatible to that used by the CPU. The channel contains all the common facilities for the control of I/O operation. The I/O operations are completely overlapped with the activity in the CPU. The only main storage cycles required during I/O operations are those needed to transfer the data to or from the final locations in main storage. These cycles do not interfere with the CPU program, except when both the CPU and the channel concurrently attempt to refer to the same storage. Each of the various sections of the channel will be considered in the following paragraphs.

Referring to FIGURE 7*a*, a data flow diagram indicates a data address register 60, a command register 62, a flag register 64, a count register 66, a storage protection register 68, a unit address register 70, and an operation register 72. Cooperating with these registers are an adder 74 and a byte counter 76. The registers are connected together through the storage bus in 40 and out 44, storage address bus in 41, and other data paths. The horizontal lines across the top of a register indicate the number of bit positions receiving a particular input. The horizontal lines across the bottom of a register indicates the number of bit positions providing a particular output. The partial circles in the data paths indicate gating means.

*Control registers*

Referring to FIGURE 7*a*, the data address register 60 is a 24 position register. Additional positions are included for parity checking. Each storage position is a latch circuit which will be described hereinafter. Data entry for the register is from two sources. Each bit position is wired to a preselected line of the storage bus in 40 and storage bus out 44. All bit positions except the three low order positions are further wired to a corresponding bit position of the adder 74. The outputs of each bit position are to a corresponding bit position of the adder 74. All bit positions except the three low order positions are further connected to preselected lines of the storage address bus 41. The three low order bit positions of the register are connected as inputs to the byte counter 76 and the corresponding positions of the adder 74.

Basically, the register 60 (21 bits thereof) holds the address where data is to be stored in the storage unit. During a transfer-in-channel command, the register holds the address of the next CCW. This same address is updated and sent to register 62 as the next CAW. The register is updated according to a read, write or a read backward operation. The three low order positions indicate the byte position of a word where storage or transfer is to begin.

The command address register 62 is a 21 position register. Each position consists of a latch of the type indicated in the data register. Three additional positions are included for parity indication. Entry to the command address register is through corresponding bit positions of the adder 64. These inputs are ANDed together with suitable gating, as will appear hereinafter. One output from the command address register is supplied to corresponding adder positions. Another output is supplied to preselected lines of a channel status bus 78 which ultimately connects to the storage data bus in 40. The other output is to storage address bus 41.

The register 62 holds the CAW which provides the location of the desired CCW. While the CCW is fetched, the CAW is updated to provide the location of the next CCW, if desired. The contents of the register become part of the CSW when an interrupt condition is signaled by the channel.

The count register 66 is a 16 bit register. Each position consists of a latch. Additional positions are included for parity checking. The register also includes a last word trigger output, a count less than two, and a count less than one trigger which will be described hereinafter. Entry to the count register is through preselected lines of the storage data bus output 44 and corresponding bit positions of the adder 74. These inputs are suitably ANDed with gating signals to be described hereinafter.

The outputs available from the count register appear in true and complement form. The three low order bits are supplied to a byte-count-register comparator 51 and mark B register 52 (see FIGURE 7*b*). All bit positions are supplied to the adder 74 and to the CSW bus 78. Suitable gating circuits operate the count register as will appear hereinafter.

The count register accepts the count field from the CCW supplied from storage. The count field is altered by the adder as data transfer occurs through the channel. Additionally, the count field and low order positions of the byte counter are algebraically related to determine the end of a data transfer operation.

The flag register 64 is a five bit position register. Each position consists of a latch. Entry to the flag register is through selected positions of the storage data bus out 40. These inputs are ANDed together with suitable gating signals as will appear hereinafter. The outputs are supplied to parity checking circuits 65. Other outputs (not shown) are supplied to various control circuits to be described hereinafter.

The flag register holds the five flags described in conjunction with FIGURE 4. The flags, for example, indicate whether chaining is to be performed or a channel error condition exists.

The unit address register 70 is an eight bit position register for receiving the address field of the CPU instruction. The address field selects the I/O device to be operated.

Entry to each bit position is supplied by the unit address bus out 36 and the data bus in 39 (FIGURE 7*b*). These input signals are suitably gating to develop output signals which are supplied to corresponding bit positions of a unit address compare register 71. The outputs are also supplied to the unit address bus in 37, and to the I/O bus out 38. Outputs (not shown) are also provided for storage data bus in gating circuit.

The register holds the address which is employed to select an I/O device. Alternatively the register holds the address of a device supplying interrupt status. Parity checking circuits are also included in the register.

The unit address compare register 71 is an eight bit position register for comparing the address on the unit address bus out 36 and the I/O bus in 38. Based on this comparison, a unit address compare signal is supplied to suitable control circuitry for operating the channel.

The storage protection register 68 is a 4 bit position register. Each position consists of a latch. Entry to the register is through preselected positions of the storage data bus out 44. These inputs are ANDed together with suitable gating signals. The outputs from the register are supplied to the storage protect bus 73 and selected bit positions of the channel status bus 78. Additionally, outputs are supplied to a parity checking circuit 69.

The register 68 holds the storage protection tag which controls the area in storage to which the channel has access.

The operations register 72 is an 8 position register. Additional positions are included for parity checking. Each position consists of a latch circuit. Entry to the operations register is through the storage data bus out 44. These inputs are ANDed together with suitable gating signals. The outputs from the register are supplied to the data out bus 38 of the I/O interface. Additionally, these outputs are also supplied to storage data bus in gating (not shown). One output (not shown) is supplied to the byte counter 76 to indicate a read backward operation.

The register 72 supplies the command code described in conjunction with FIGURE 4 and Table I for operating the I/O devices 15′ . . . 16′ (see FIGURE 1) in the particular modes, i.e., read, write, sense, and the like. Commands that initiate these operations cause all eight bits to be transmitted to the I/O device. The high order bits contain modifier bits. These bits specify to the I/O device the details of how the command is to be executed. They may cause the I/O device to compare data received during a write operation with data previously recorded and they may specify such conditions as recording density and parity. For the control command, the modifier bits may contain the order code specifying the control function to be performed.

Whenever the channel detects an invalid command, a program check condition is generated. When the CCW contains an invalid code, the status portion of the CSW is stored during the execution of the start I/O instruction. When the invalid code is detected during command chaining, the new operation is not initiated and an interruption condition is generated. The commad code is disregarded during data chaining.

The adder 74 is a 24 position unit including a full adder portion and an increment and decrement portion. The full adder portion involves the four low order bit positions. The remainder of the adder is the increment and decrement portion. All bit positions have a latched output controlled by suitable gating circuitry.

Entry from the low order bit positions is from the data register 60. Additional inputs are supplied from the count register 66 which supplies inputs to all adder bit positions. Bit position 4 receives a carry signal (not shown) from the increment-decrement portion and the data address signal. Outputs are supplied to a parity checking circuit (not shown), the incrementer-decrementer position (not shown) and the count register 66.

Each bit position of the incrementer-decrementer receives inputs from the command address register 62 and the data address register 60. Additionally, these bit positions except the last bit or high order positions receive an input from the count register 66. Outputs are supplied to the data address register 60, command address register 62, and count register 66. An output is also supplied to a parity error checking circuit (not shown). Incrementing or decrementing is determined by an adder group carry and borrow circuits (not shown).

The adder, incrementer-decrementer, parity prediction circuits, group carries and borrow circuits cooperate to update the count field and increment or decrement the data address or command address fields. During these processes the command address registers and count register are verified from a parity error standpoint. Any parity error is reported to the appropriate controls for initiating the proper diagnostic routine for the channel. The adder decrements the count by eight and increments the data address by eight.

The byte counter 76 is a three position unit for variable word boundary selection of the data transmitted between the I/O device to storage. The counter includes a register 75, a decoder 77, and a latch 79. Each register bit position 78 comprises three like circuits suitably interconnected. Entry to each bit position is supplied by the three low order outputs of the data address register 60. Suitable gating signals (not shown) are provided in developing output signals supplied to the byte counter decoder 77 and latch circuits 79. Outputs are also supplied to a parity and zero check circuit to be described hereinafter.

The byte counter decoder 77 receives the three inputs from the register 75 and provides like outputs to mark B register 52 and the data B register 59 (see FIGURE 7*b*). The encoder selects the appropriate triggers of the mark B register and data B register for operating the storage address bus in supplying the data stored in the A register 58 to storage. The latch 79 receives the same inputs as the register 75. These outputs are supplied to a byte counter-count register comparator 51 shown in FIGURE 7*b*. The byte counter is a binary octal counter with a parity bit for self checking purposes. The latch and decoder sections form a look-ahead feature which eliminates ripple time associated with binary trigger counters. When the byte counter receives a change signal, the register 75 is set to the value in the look-ahead feature. The look-ahead value is arranged to be one number higher than that in the register positions. Once the register has changed, there is no delay required to decode the outputs as the look-ahead feature is latched while the counter is changing. The look-ahead circuitry advances immediately to the next number as soon as the change occurs. The counter may be set to any number by the data address input.

*Data transfer registers*

Having described the programming control registers for the channel, it is believed now in order to describe the data transfer registers for transferring data between storage and the I/O devices. Referring to FIGURE 7*b*, the data transfer registers include a mark A register 50, a mark B register 52, an A register 58, a B register 59, a byte counter-count register comparator 51, I/O bus in circuits 54, I/O bus out circuits 53, channel status circuits 57 and an address compare register 55. Each of these registers will be considered in the separate paragraphs hereinafter.

The mark A register 50 is an eight position register that includes an additional position for a parity error check. Each bit position is a conventional latch circuit. Entry to the mark A register is from corresponding bit position of the mark B register. These inputs are ANDed together with suitable gating signals.

The mark A register also receives as gating inputs channel memory controls and other signals. These control signals cooperate with the bit position inputs to provide outputs to the mark bus 73 of the storage. Outputs provided by the various bit positions of the mark A register set the storage triggers for storing data at selected storage locations.

The mark B register 52 is an eight bit position register. Each bit position is a conventional latch circuit. Entry to the mark B register is supplied by the output of the byte counter decoder 77. The count register 66 also supplies its four low order bits to corresponding positions of the mark B register. These signals are ANDed together with suitable write control signals and a gating signal. The register also includes means for parity error checking. All bit positions are supplied to the corresponding bit positions of the mark A register. The three low order bit positions are supplied to the byte count register comparator 51 for word boundary determination. The three low order bits are also supplied to the storage data bus out 44. The mark B register sets the mark A register based upon received inputs.

The A register is a 64 bit register for transferring data or assembling data between the storage 10 and the I/O devices 15′, 16′ and the like (see FIGURE 1). Each bit position is a conventional AND/OR/INVERT cooperating with a conventional inverter to form a latch circuit. Entry to each bit position is from preselected lines of the storage data bus out 44. Also, the corresponding bit positions of the B register 59 are connected to the A register bit positions. These inputs are ANDed together with suitable storage data bus gating signals. As outputs, each bit position is connected to corresponding bit positions of the B register and to preselected lines of the storage data bus in 40. A parity bit is generated for each byte and supplied to the B register and the storage data bus in.

The B register 59 is like the A register, a 64 bit register. Each bit position has the same circuit configuration. Entry to each bit position is from the corresponding bit position of the A register. Each bit position is further connected to the I/O bus in 39. These inputs are ANDed together with A register gating signals and I/O gating signals. The I/O gating signals direct the various bytes of incoming data to the various byte positions. The number of bit positions in a group is selected as eight to handle the byte of information coming from the I/O device. Each group of bytes includes parity error checking means.

The output from each bit position is supplied to corresponding bit positions of the A register as previously indicated. Outputs are also provided to preselected lines of the I/O data bus out 38. Thus, the B register is adapted to transfer data into storage and out to the I/O devices.

The comparator 51 is a six position unit for receiving true and complement signals from the byte counter latch 79 and the count register 62 (see FIGURE 7*a*). The true and complement signals from different registers are ANDed together to provide an output to suitable control circuitry. The comparator also receives as an input the three low order bits of the mark B register 52. These inputs are ANDed together with the byte counter latch 79 outputs to provide an output indicating that the byte counter equals the mark B register. This output is also supplied to suitable control circuitry to be described hereinafter.

During data transfer, the comparator 51 compares the inputs of the count register 66 and the byte counter 76 (see FIGURE 7*a*) to determine the termination of data transfer. The details of this operation will be provided in conjunction with a description of the channel operation.

The bus in receiver and latch circuit 54 is an eight position unit with an additional position for parity indication. Each postion is a conventional latch circuit. Each position is connected to a particular line of the I/O bus in 39. Outputs are supplied to preselected lines of the B register. Other outputs are supplied to preselected bit positions of the unit address register 70 (see FIGURE 7*a*). Additionally, outputs are supplied to the channel status circuit 57 to be described hereinafter. The unit 54 is operated by suitable gating signals supplied by control circuits.

The bus out receiver and latch circuit 53 is arranged in a configuration substantially the same as that described for the unit 54. The unit has eight positions plus an additional position for parity. Each position is a conventional latch circuit. Preselected positions are the B register 59 connected to selected unit positions 53. Additionally, the operation register 72 and the unit address register 70 are connected to selected unit positions 53. Outputs are supplied to the I/O bus out 38. Outputs on the line are determined by the tag lines 18*b* described in connection with FIGURE 6. Outputs appear on the line according to gating signals supplied from suitable control circuitry.

The address compare register 55 is an eight position register and includes an additional position for parity check. Each position is a conventional AND/OR/INVERT circuit. Each position is connected to the I/O bus out 38 and to the input circuitry for the unit address register 70 (see FIGURE 7*a*). An output signal is supplied to suitable control circuitry (not shown) in connection with the initial setup of the channel when responding to an instruction.

The channel status circuits 57 comprise a plurality of latch circuits responsive to various inputs for indicating the various conditions of the I/O status. Among the various channel status circuits are a wrong length record, a command address update, a program check, a memory protection, a data channel check, a channel control check, and a chaining check. Each latch circuit receives various flag, trigger, control, and gating signals to develop the desired status signal. The output from the various latch circuits are supplied to the channel status bus 78 for transmission to a storage unit over the storage bus in 40. Outputs (not shown) are supplied to other control circuits.

*Branch on condition*

As described above, when a channel command word (CCW) is being fetched by the channel, the command address specified by the start I/O instruction is updated by incrementation of one double word location where a word is defined as four bytes each byte containing 8 bits not including parity bits. This incrementation is accomplished by adder 74 of FIGURE 7*a* which includes circuitry to add a unit bit to the command address which has been stored in register 62 should command chaining be specified by the channel command word presently being fetched.

With the present invention, when branch on condition is specified by the status information, the circuitry which is adapted to add a unit bit to the command address in adder 74 is suppressed and a similar circuit adapted to add two unit bits to the command address is activated in a manner which will be explained. The two status signals received from the peripheral device and employed to cause the branch on condition are a device end signal signifying that the peripheral device has completed the current instruction and a status modifier signal. The status modifier signal is required to change the significance of the device end signal which by itself would merely permit command chaining when the command chaining flag is specified in the channel command word. For branch on condition it is required that these two signals and no other signals appear at the channel status latches 57. To detect such a condition, latches 57 (FIGURE 7*b*) are connected to decoder 101 (FIGURE 7*a*). Specifically, the second bit in the status field represented by status latches 57 is designated as the status modifier while the seventh bit therein is designated as the device end bit. With this arrangement, decoder 101 may consist of a plurality of invert circuits attached to the latches representing bits 1, 3, 4, 5 and 6, the output of which inverter circuits are ANDed together with the leads from the latches representing bits 2 and 7. The output signal of this decoder is supplied to AND circuit 102 as indicated in FIGURE 7*a* as is a signal from the second bit position in the flag field of flag register 64, this latter signal existing when command chaining is designated. The output of AND gate 102 is in turn supplied to adder 74 to suppress the addition of a 1 to the command address and activate the addition of a 2 to the command address as indicated above.

With the circuitry thus described, the channel or control apparatus for a peripheral device is capable of selecting a command from a storage location, and when chaining is specified, to select another command upon the execution of the first command, and so forth. With the command format as described, a further command may be a transfer-in-channel command to a non-adjacent storage location to execute a new sequence of commands. If the transfer-in-channel command is one to a previously executed command to form a loop as required for the repetition of a particular peripheral operation, the present invention provides for continuing on with a new sequence of commands once the peripheral operation has been completed by causing a conditional branch to a new sequence of commands.

As described in the above-identified Patent 3,368,207, search operations on disks or drums are performed to find the areas to be written on a track or to be read from it. In search operations, designated track information is compared to information (the search argument) supplied to the channel from main storage. The search argument is addressed by the data address portion of the channel command word designating the search operation. When search operations go to completion, channel end and device end are indicated in the status byte. Any search operation that results in a successful comparison sets the status modifier bit in the statue byte of the control unit.

When command chaining has been specified, the combination of status modifier and device end causes the adder 74 to add two unit bits to the command address register 62 rather than the usual unit bit which is added during a normal command chaining operation. This causes the channel to fetch the channel command word whose main storage address is sixteen higher than that of the current CCW.

An example of the use of a transfer-in-channel command to form a loop for the repetition of a particular operation is the search to find a particular record key. If chaining is specified, at the completion of the current channel command word (CCW) the channel operation automatically goes to the channel command word at the next sequential location. Each CCW used specifies a new I/O operation and it is not necessary to interrupt the computer to obtain the next CCW. When a track is to be searched to find a particular record key, usually the first key encountered is not the desired key. Therefore, the CCW which instituted the search is followed by and chained to a transfer-in-channel (TIC) command each time a key is searched that does not satisfy the search condition. The TIC merely causes the channel to branch to a specified CCW which in this case is the original search key command which is now repeated. Thus the next sequential key is inspected when the search key command is repeated. When the search condition is satisfied, that is when the desired key has been found, the channel must branch to a CCW which will now specify the operation to be performed on the data area identified by the key. This CCW could specify a write data or read data command. This branching operation is accomplished by utilizing the present invention. When search operations go to completion, the I/O control unit signals device end and if the search operation has resulted in a successful comparison, the control unit sets the status modifier bit in the status byte. These two conditions, i.e. device end and status modifier cause an output from the decoder 101 (FIGURE 7*a*). Since command chaining is specified, the output from flag register 64 energizes AND circuit 102 in conjunction with the output of the decoder 101. This causes the command address register to pass over the transfer-in-channel command and thereby break the loop which had been set up. This is accomplished by instead of specifying the next sequential address by incrementing the command register by one address, the command address register is incremented by two addresses thus going to the channel command word following the transfer-in-channel command.

*Synchronization of two data processors*

In addition to the searching operation in a direct access peripheral storage device such as disclosed in the above referred to Patent 3,368,207, the present invention may also be used to control other peripheral devices and even to synchronize two data processing systems coupled together for parallel processing or multi-processing.

Figure 5:
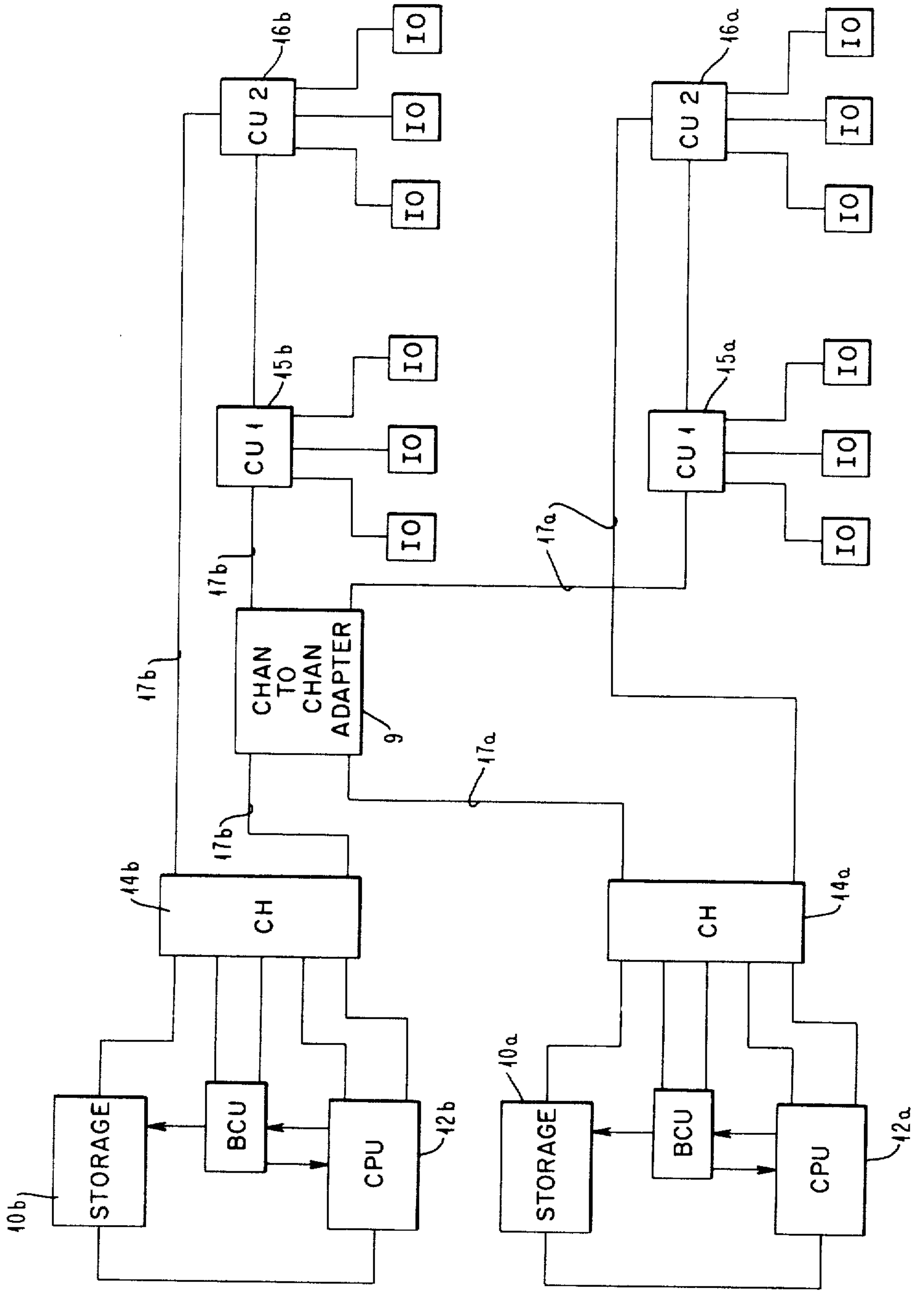
FIGURE 5 is a schematic diagram of a different embodiment of the present invention.

A dual data processing system of the above-referred to type is illustrated in FIGURE 5.

FIGURE 5 discloses a dual data processing system each one of which contains units of the type shown on FIGURE 1 with the exception of channel-to-channel adapter 9 interposed in the I/O interfaces 17*a* and 17*b* of the two systems respectively. A channel adapter of the type shown in FIGURE 5 is described in co-pending application Serial No. 432,970, filed February 16, 1965 and assigned to the assignee of the present application.

The channel adapter 9 electronically connects the data channel 14B of one data processing unit to the data channel 15B of a second data processing unit. The I/O channel 17B of the first data processing unit includes data transfer buses from both data in and data out, tag lines identifying signals on the buses and control lines for selecting and interlocking the first data processing unit with the channel adapter. The second data processing unit also has an interface 17A which includes data transfer buses for data in and data out, tag lines identifying signals on the buses and control lines for selecting and interlocking the second data processing unit with the channel adapter 9.

The channel adapter 9 looks like an input/output device attached to the channels 14A and 14B and is assigned an address which can be transmitted from either channel to select the adapter from among other input/output units that are connected to each channel. Information to be transferred from one channel to the other channel is held by a single register or buffer in the adapter which is connected to the appropriate channel interface under the control of gating logic. In order to transfer data from one data processing unit to the other, the first data processing unit initiates a write command and the second data processing unit initiates a read command. Thus, the first data processing unit transfers data across the interface as if it were performing a write operation and places the data in the buffer. The other data processing unit then operates as if it were performing a read command and in response to control signals generated by the write operation takes the data from the buffer and transfers it to its own storage.

Thus, if CPU 12*a* executes a start I/O write instruction and specifies adapter 9 as the I/O unit, channel 14*a* will select the appropriate write command word from storage 10*a* and signal adapter 9 with the appropriate command out tag as indicated in FIGURE 6. In response thereto, adapter 9 will signal channel 14*b* over interface 17*b* by raising the appropriate request in line on interface 17*b* in response to which channel 14*b* will select a predetermined read command word from storage 10*b*. Upon completion of the respective interlocks, channel 14*a* will be reading from storage 10*a* for transmission to adapter 9 while channel 14*b* will be receiving from adapter 9 to write into storage 10*b*. The respective operations will be conducted according to the CCW format and channel operation as has been described in relation to FIGURE 1. This arrangement allows for transfer of data and other information from one data processing system to another with a minimum of interruption of the respective CPU's or the main programs they are executing. With the present invention, not only can the respective channel command words designate a transfer-in-channel command, for example, if it is required that channel 14*b* scatter incoming data throughout storage 10*b* or that channel 14*a* gather data scattered throughout storage 10*a*, but also a branch on condition operation can be employed in either channel with the present invention, the external condition resulting in the branch being generated by the other data processing system.

*Summary*

With the present invention, a series of operations at a peripheral device can be initiated by the CPU of the system which issues a start I/O instruction after which the CPU is free to carry on its own main program, the channel selecting its own command words from storage as required to carry out the sequence of peripheral operations. If a branch to a new sequence of commands is required, this may be provided by the transfer in command instruction placed in an appropriate one of the channel command words. If a conditional branch is required during such peripheral operation, this is provided by the present invention which may be employed by the control of any peripheral device, be it a typical I/O unit such as a tape unit or the peripheral device may be another data processing system While the present invention has been particularly shown and described with reference to preferred embodiments thereof, it will be understood by those skilled in the art that the various changes in form and details may be made therein without departing from the spirit and the scope of the invention as claimed.

What is claimed is:

1. A peripheral control apparatus in a data processing system including a processor, a storage coupled thereto and a peripheral device, said apparatus comprising:
   - address means for providing a storage address to access a storage location in said storage;
   - means for incrementing said address means by one location address; and
   - conditional branching means responsive to said peripheral device to cause said incrementing means to increment said address means by more than one location address.

2. A channel of the type in which input/output operations are carried out in response to command words obtained by said channel from a storage, comprising:
   - address means in said channel for specifying the address of a command word in said storage;
   - means responsive to the contents of a current command word obtained from said storage at said specified address for incrementing said address means a fixed amount so as to address a next command word upon completion of the operation called for by said current command word; and
   - means operable in response to a signal from said input/output device for causing said incrementing means to increment said address means by more than said fixed amount to thereby pass over the next address.

3. In a data processing system including a central processing unit, a storage having a series of input/output commands stored in sequential locations in said storage, a channel, an input/output device responsive to said channel and adapted to perform input/output operations in response to said input/output commands, the improvement comprising:
   - address registering means in said channel for initially addressing the first in said series of sequential locations,
   - means for incrementing said address means one location address each time said input/output device signals that the performance of an input/output command is completed;
   - and means for incrementing said address means by more than one location address in response to a signal from said input/output device to thereby alter the sequence of command performance without interrupting said central processing unit.

4. In a data processing system including a central processing unit, a storage having a series of input/output commands stored in sequence in said storage, a channel, an input/output device responsive to said channel and adapted to perform input/output operations in response to said input/output commands, the improvement comprising:

means in said channel for initially fetching the first in said series of sequential commands, means for causing said fetching means to fetch the next command in said series each time said input/output device signals that the performance of an input/output command is completed;

and means for modifying said fetching means in response to a signal from said input/output device to thereby alter the sequence of command fetching without interrupting said central processing unit.

5. In a first data processing system including a central processing unit, a storage having a series of commands stored in sequential locations in said storage, a first channel control unit, a channel-to-channel device responsive to said first channel control unit and adapted to perform data transfer operations between said first channel control unit and a second channel control unit in a second data processing system in response to said commands, the improvement comprising:

means in said channel control unit for initially fetching the first in said series of sequential commands, means for causing said fetching means to fetch the next command in said series each time said second channel control unit signals that the performance of a command is completed;

and means for modifying said fetching means in response to a signal from said second channel control unit to thereby alter the sequence of command fetching without interrupting said first central processing unit.

6. In a first data processing system including a central processing unit, a storage having a series of commands stored in sequential locations in said storage, a first channel control unit, a channel-to-channel device responsive to said first channel control unit and adapted to perform data transfer operations between said first channel control unit and a second channel control unit in a second data processing system in response to said commands, the improvement comprising:

address registering means in said channel control unit for initially addressing the first in said series of sequential locations, means for incrementing said address means one location address each time said second channel control unit signals that the performance of a command is completed;

and means for incrementing said address means by more than one location address in response to a signal from said second channel control unit to thereby alter the sequence of command performance without interrupting said first central processing unit.

References Cited

UNITED STATES PATENTS

| | | | |
|---|---|---|---|
| Re. 26,171 | 3/1967 | Falkoff | 340—172.5 |
| 3,319,226 | 5/1967 | Mott et al. | 340—172.5 |
| 3,312,943 | 4/1967 | McKindles et al. | 340—172.5 |
| 3,300,764 | 1/1967 | Doelz et al. | 340—172.5 |
| 3,278,906 | 10/1966 | Gountanis et al. | 340—172.5 |
| 3,274,561 | 9/1966 | Hallman et al. | 340—172.5 |
| 3,243,781 | 3/1966 | Ehrman et al. | 340—172.5 |
| 3,226,683 | 12/1965 | Gaffney | 340—172.5 |
| 3,225,334 | 12/1965 | Fields et al. | 340—172.5 |
| 3,222,647 | 12/1965 | Strachey | 340—172.5 |
| 3,178,690 | 4/1965 | Masters et al. | 340—172.5 |
| 3,168,724 | 2/1965 | Anderson | 340—172.5 |

PAUL J. HENON, *Primary Examiner.*

GARETH D. SHAW, *Assistant Examiner.*